(12) United States Patent
Maroni et al.

(10) Patent No.: US 7,992,058 B2
(45) Date of Patent: Aug. 2, 2011

(54) METHOD AND APPARATUS FOR LOOPBACK SELF TESTING

(75) Inventors: Peter D. Maroni, Fort Collins, CO (US); Gregg B. Lesartre, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 244 days.

(21) Appl. No.: 12/335,728

(22) Filed: Dec. 16, 2008

(65) Prior Publication Data

US 2010/0153799 A1  Jun. 17, 2010

(51) Int. Cl.
*G01R 31/28* (2006.01)
*G01R 31/08* (2006.01)
*H04B 1/38* (2006.01)
*H04M 1/24* (2006.01)

(52) U.S. Cl. ........ 714/712; 714/716; 370/224; 370/249; 375/221; 379/22.01

(58) Field of Classification Search .................. 714/712, 714/716; 370/224, 249; 375/221; 379/22.01
See application file for complete search history.

(56) References Cited

U.S. PATENT DOCUMENTS

| | | | | |
|---|---|---|---|---|
| 7,127,648 | B2 * | 10/2006 | Jiang et al. ..................... | 714/715 |
| 7,444,558 | B2 * | 10/2008 | Mitbander et al. ............ | 714/716 |
| 2004/0260985 | A1 * | 12/2004 | Krieger ......................... | 714/707 |
| 2005/0256984 | A1 | 11/2005 | Jenkins et al. | |

OTHER PUBLICATIONS

Nejedlo, "IBIST (Interconnect Built-in-Self-Test) Architecture and Methodology for PCI Express", Sep. 30-Oct. 2, 2003, IEEE, pp. 114-122.*
PCI-SIG, "PCI Express Base Specification Revision 1.0", Apr. 29, 2002, PCI-SIG, pp. 31,32,45,150-152,158-160, 164-169,181,182,197,222,231,241-243,378.*
Venkatavaradan, Virtex-4 RocketIO Bit-Error Rate Tester XAPP713 (v1.1), Apr. 18, 2007, Xilinx, pp. 1-43.*
Morris et al., PHY Interface for the PCI Express Architecture, Jun. 19, 2003, Intel Corp., version 1.00, pp. 1-31.*
Lattice Semiconductor Corp., ORCA® ORT42G5 and ORT82G5 data sheet, Aug. 2005, pp. 1-119.*
Agere Systems, ORCA® ORT82G5 1.0-1.25/2.0-2.5/3.125 Gbits/s Backplane Interface FPSC Preliminary Data Sheet, Jul. 2001, pp. 1-93.*

* cited by examiner

*Primary Examiner* — John J Tabone, Jr.

(57) ABSTRACT

A system and method for loopback self testing. A system includes a host device and an endpoint device. The host device transmits unencoded test symbols. The endpoint device loops back the unencoded test symbols to the host device. The host device drives at least some bits of each unencoded test symbol onto host device data signals and drives at least some bits of each unencoded test symbol onto host device control signals.

18 Claims, 3 Drawing Sheets

METHOD AND APPARATUS FOR LOOPBACK SELF TESTING

BACKGROUND

Over the years, various standards have been applied to permit connection of peripheral devices (i.e., peripheral expansion boards) to a computer mainboard. Parallel bus standards, such as Industry Standard Architecture ("ISA"), Extended ISA ("EISA"), Micro Channel Architecture ("MCA"), Video Electronics Standards Association Local Bus ("VLB"), Accelerated Graphics Port ("AGP"), and Peripheral Component Interconnect ("PCI®") specified the computer expansion buses predominately used at various times in the recent past.

As computing speeds and input/output requirements increased, the disadvantages of parallel buses became apparent. The large number of conductors and the space required by the conductors make parallel buses costly. The transfer rate of parallel buses is limited by the skew (the delay differences) of the different signal paths.

To overcome these, and other, problems presented by parallel bus solutions, the computer industry has developed and implemented serial interconnect standards. The fewer conductors used by serial interconnect schemes lowers system cost by reducing board, cable, and connector size. By reducing the number of signal paths, serial interfaces allow for an increase in transmission rates that compensate for the reduced width of the serial data path.

Peripheral Component Interconnect Express ("PCI Express®" or "PCIe®") is a serial interconnect standard designed to replace various parallel bus standards (e.g., PCI, AGP, etc.) in computer systems. PCIe provides a point-to-point topology wherein each device can have a dedicated connection to each other device through a crossbar switch. A dedicated connection between two devices is termed a link. A link is composed of up to 32 lanes. A lane is a full-duplex communication path made up of two differential pairs, each differential pair carrying data in one direction.

The first generation PCIe specification ("PCIe 1.X") provides for data transfers at 2.5 giga-bits per second ("Gb/s") per lane. The second generation PCIe specification ("PCIe 2.X") provides for double the rate of the first generation specification, i.e., 5 Gb/s per lane. Aggregating multiple lanes in a link increases the available data rate in accordance with the number of lanes. PCIe 2.X and later PCIe versions maintain backward compatibility with PCIe 1.0, allowing use of PCIe 1.0 devices in a PCIe 2.X system.

The PCI Special Interest Group ("PCI-SIG®") provides compliance tests for validating PCIe devices. PCI-SIG publishes a list of devices demonstrating compliance to a PCI-SIG test suite. Manufacturers of PCIe devices may desire to characterize the operation of their products under conditions other than those stipulated by the PCI-SIG compliance requirements.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
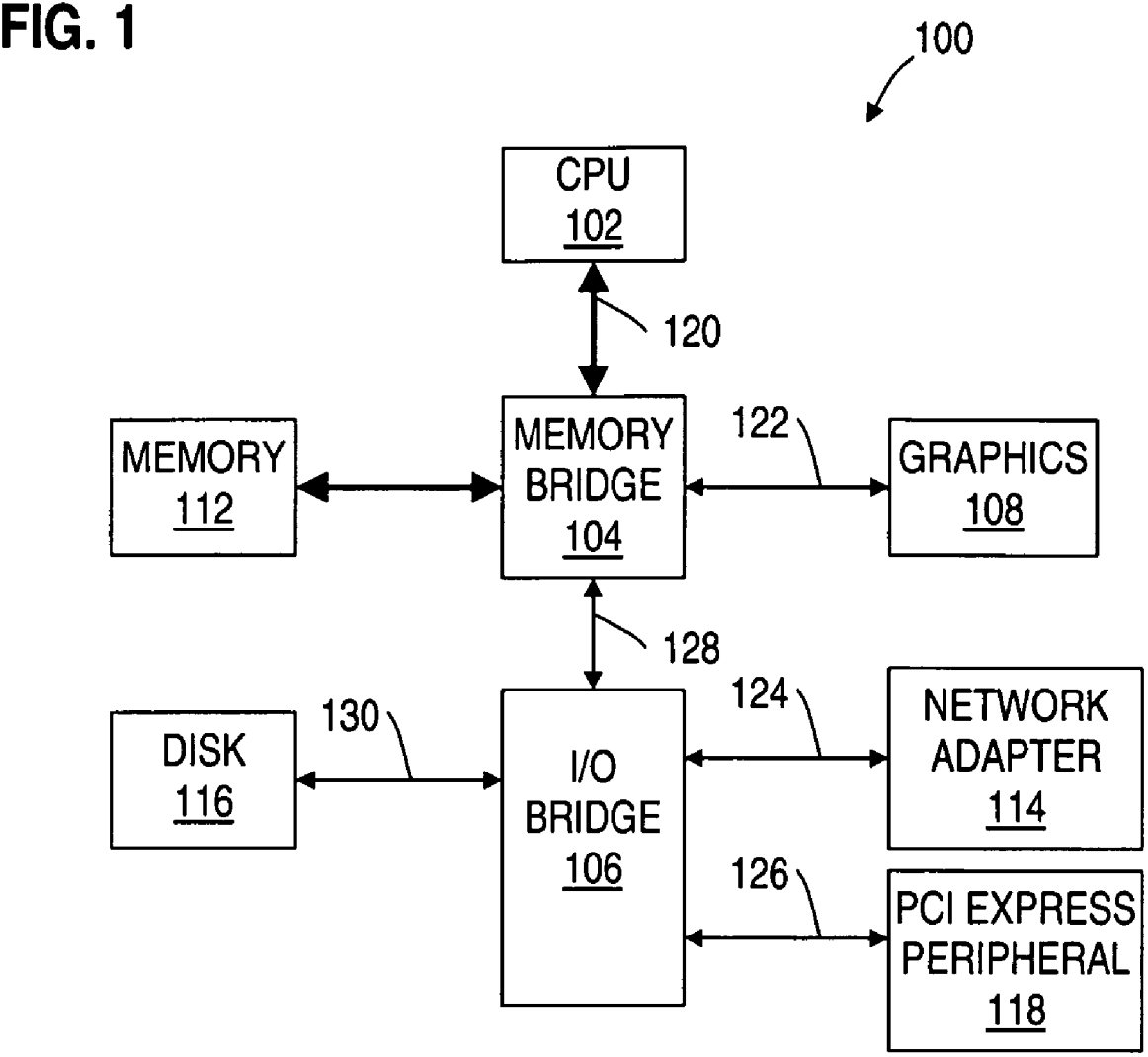
FIG. 1 shows a system that includes devices employing PCI Express ("PCIe®") with interconnect built in self-test ("IBIST") capability in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

An apparatus and method for self-testing devices compliant with the Peripheral Component Interface Express ("PCI Express®" or "PCIe®") specification are disclosed herein. To enable electrical characterization the high-speed serial links (i.e., lanes) of a PCIe system, the ability to control the data transmitted on a lane is desirable. At first generation and second generation PCIe speeds (i.e., 2.5 giga-bits/second and 5 giga-bits/second respectively), the PCIe architecture specifies 8b10b encoding and decoding to equalize the number of ones and zeros transmitted. 8b10 encoding converts an 8-bit pattern to a 10-bit pattern. The PCIe specification includes no means for transmitting data that is not 8b10b encoded (i.e., raw data).

Embodiments of the present disclosure provide for transmission of unencoded 10-bit symbols to allow controlled electrical characterization of PCIe devices and device interconnections. Some embodiments take advantage of the PHY Interface for the PCI Express ("PIPE") Architecture to provide the unencoded symbols. The data path used to move 8-bit symbols through a PCIe host device is employed to route eight of the ten symbol bits, and control/status signals specified for various control functions are employed to route the remaining two bits of the unencoded symbol. PCIe host device in accordance with the present disclosure can be used with any PCIe compliant endpoint device to provide characterization of the electrical interfaces of the devices and the channel connecting the devices.

By providing direct control of the symbols transmitted, embodiments enable more stringent testing than would be possible when not bypassing encoders and decoders. For example, embodiments allow a differential receiver's common mode tolerance to be stressed by transmitting an unbalanced numbers of ones or zeros. Differential transmitter characterization can include sending an arbitrary number of consecutive ones or zeros, which allow for return loss measurements and characterization of noiseless de-emphasis/pre-emphasis. A receiver's clock/data recovery circuitry can be tested for ability to achieve bit lock. The data channel can be validated for noise and resonance. Embodiments enable broad margining of the entire link that would not otherwise be possible because of the limitations presented by the PCIe 8b10b coding requirement.

FIG. 1 shows a system that includes devices employing PCI Express with interconnect built in self-test ("IBIST") capability in accordance with various embodiments. The system of FIG. 1 includes a central processing unit ("CPU") 102, a memory bridge 104, also referred to as a north bridge, and an I/O bridge 106, also referred to as a south bridge. The CPU 102 can comprise any general-purpose processor, digital signal processor, microcontroller, etc. that executes software programming. Embodiments of the CPU 102 can include execution units (integer, floating-point, fixed-point, etc.), instruction decoding, registers, caches, input/output devices and interconnecting buses. The bus 120, sometimes referred to as a front-side bus, couples the CPU 120 to the memory bridge 120, and through the memory bridge 120, to at least some other system components.

The memory bridge 104 and I/O bridge 106 are sometimes referred to as a chipset. Generally, the bridges 104, 106 serve to couple the CPU 102 to other system components. While illustrated as separate devices, the memory bridge 104 and the I/O bridge 106 can be integrated into a single device or package. As shown, the memory bridge 102 couples the CPU 102 to memory 112 and graphics adapter 108. Memory 112 is a computer readable medium and can include various types of semiconductor memory (dynamic random access memory ("DRAM"), static random access memory ("SRAM"), etc.). The interface between the memory bridge 104 and the memory 112 preferably comprises a parallel bus, for example, a 32-bit or 64-bit data bus with multiplexed addresses and additional control signals, but no particular bus architecture is required.

The graphics adapter 108 provides visual displays for a user. Graphics can consume a large amount of bandwidth, therefore in the illustrated embodiment, a PCIe link 122 couples the graphics adapter 108 to the memory bridge 104. The link can comprise one or more lanes to provide the bandwidth necessary to transfer data to the graphics adapter 108.

The I/O bridge 106 provides interfaces for a variety of different devices. In at least some embodiments, the I/O bridge interfaces to a disk drive 116, a network adapter 114, and/or another PCIe peripheral 118. In some embodiments, a PCIe link 128 couples the I/O bridge 106 to the memory bridge 104 to provide adequate bandwidth for the high-speed peripherals (e.g., network adapter 114) coupled to the I/O bridge 106.

The disk drive 116 can be, for example, a magnetic or solid-state disk coupled to the I/O bridge 106 via a serial advanced technology attachment ("SATA") interface, a fiber channel interface, etc.

The network adapter 114 can be, for example, a 10 Gb/s Ethernet adapter coupled to the I/O bridge 106 by a PCIe link 124. Other PCIe enabled devices, represented by, PCIe peripheral 118 are also connected to the I/O bridge 106 by a PCIe link 126.

Each of the described devices that provide a PCIe interface preferably comprises IBIST capability. The IBIST capability preferably enables a host device, for example the I/O bridge 106, to transmit unencoded 10-bit symbols over a lane connecting the host 106 to a PCIe endpoint device (e.g., network adapter 114.) The network adapter 114, when placed in loopback mode as defined by the PCIe specification, receives the unencoded symbols and retransmits the symbols back to the host 106. The host 106 receives the unencoded symbols and compares the symbols to the transmitted symbols to characterize the lane (e.g., transmitter logic, receive logic, interconnect etc.). Each 10-bit symbol is preferably formed by concatenating an 8-bit data bus and two or more control/status lines that embodiments employ as data lines during IBIST. Embodiments thus allow for transmission of unencoded 10-bit data, while reducing the data path logic used to route the unencoded data.

Figure 2:
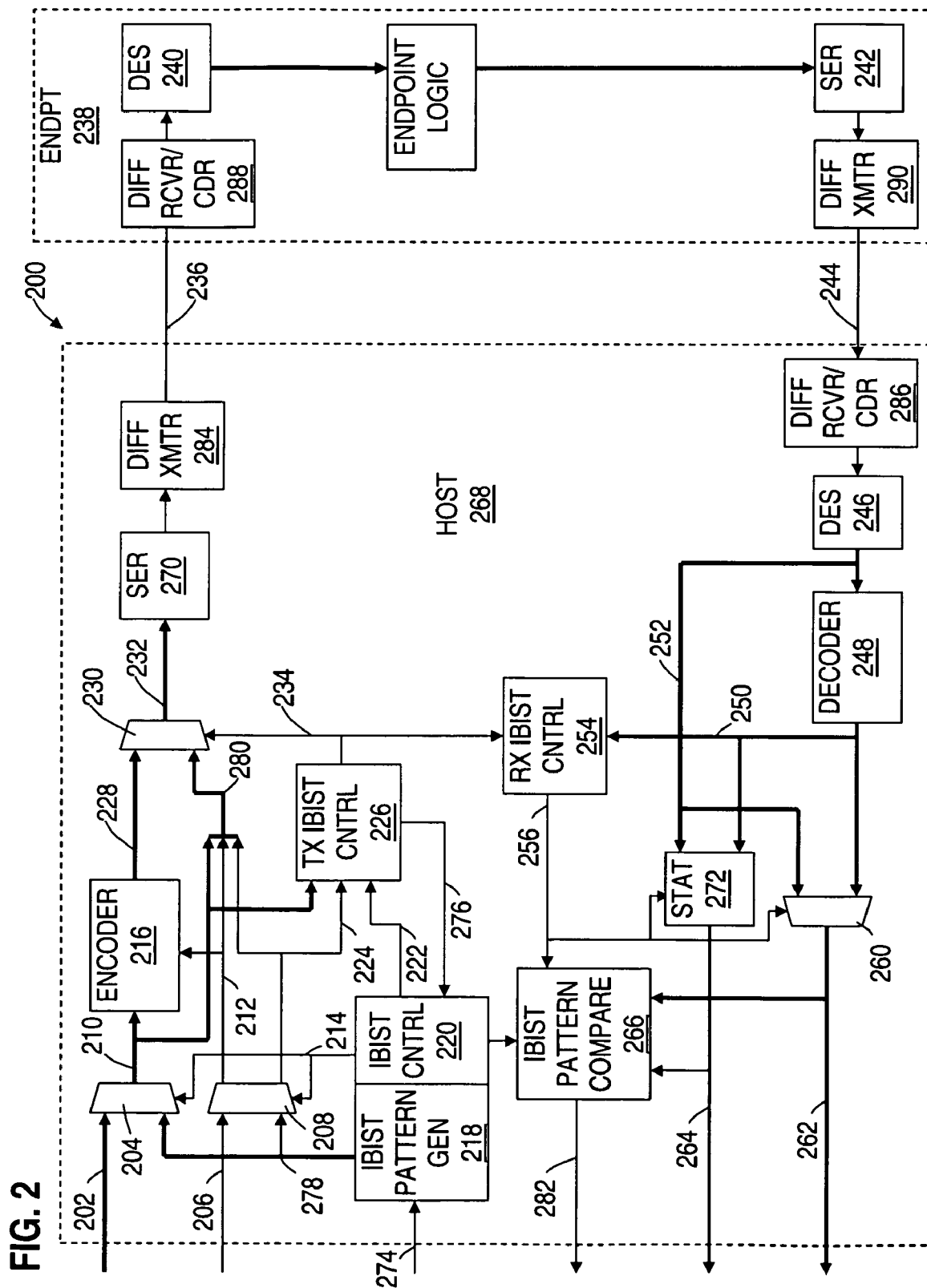
FIG. 2 shows an exemplary block diagram of a PCIe system that includes IBIST in accordance with various embodiments.

FIG. 2 shows an exemplary block diagram of a PCIe system 200 that implements IBIST in accordance with various embodiments. The system 200 includes a host device 268 and an endpoint device 238. The endpoint device 238 can be any PCIe device capable of loopback operation as defined by the PCIe specification. During loopback operation, the endpoint 238 receives a serial bitstream 236 via differential receiver/ clock and data recovery circuit 288. Recovered bits and clock are provided to a deserializer 240 the converts the serial bits to multi-bit (e.g., 10-bit) symbols. The output of deserializer 240 is provided to a serializer 242 that re-serializes the multi-bit symbols. The serial output of the serialized 242 is provided to differential transmitter 290, which transmits a bitstream 244 to the host 268. Thus, the endpoint 238 retransmits received symbols without decoding and re-encoding the symbols. Inclusion of loopback capability in PCIe devices is required by the PCIe specification.

The host device 268 includes components that generate a transmit bitstream, components that receive a transmitted bitstream, and various IBIST components. The host 268 transmit data path includes selectors 204, 208, and 230, encoder 216, serializer 270, and differential transmitter 284, with control provided by IBIST CNTRL unit 220, and TX IBIST CNTRL unit 226. IBIST PATTERN GENERATOR 218 provides IBIST test data. The test data provided by the IBIST PATTERN GENERATOR 218 is programmable in at least some embodiments. Embodiments of the IBIST PATTERN GENERATOR 218 can include memory for storage of patterns, a pseudo-random number generator, and/or repeated pattern generators to facilitate testing over extended time periods for measuring low error rates. The selector 204 selects one of normal (i.e., non-IBIST) data 202 and IBIST data 278 for transmission. In some embodiments, the selector output 210 comprises 8-bit symbols. The selector 208 selects one of normal control 206 and IBIST data 278 to provide signals TxCompliance 224 and TxDataK 212. In normal (i.e., non-IBIST) operation, TxCompliance 224 and TxDataK 212 provide control functions in accordance with the PIPE specification. In embodiments of the present disclosure, TxCompliance 224 and TxDataK 212 are used as two of the IBIST data lines. The encoder 216 encodes the output 210 of the selector 204 (e.g., 8b10b encoding) to generate encoded symbols 228. The selector 230 selects one of encoded symbols 228 and unencoded symbols 280 for serialization. The serializer 270 converts symbols 232 from parallel to serial form, and provides the serialized symbols to differential transmitter 284, which transmits the bitstream 236 to the endpoint 238.

The IBIST CNTRL unit 220 controls selection of normal data/control 202, 206 or IBIST data 278 by selectors 204, 208. TX IBIST CNTRL unit 226 controls selection of encoded symbols 228 or unencoded symbols 280 by selector 230, and coordinates with the IBIST CNTRL unit 220 to initiate IBIST data generation in the IBIST PATTERN GENERATOR 218.

The host device 268 receive data path comprises a differential receiver/clock and data recovery circuit 286, deserializer 246, decoder 248, status generator 272, and selector 260, with control provided by the RX IBIST CNTRL unit 254. IBIST PATTERN COMPARE unit 266 verifies received IBIST data 262, 264 against IBIST PATTERN GENERATOR output. The differential receiver/clock and data recovery circuit 286 detects bits in the bitstream 244, and extracts a clock aligned with the bits. The deserializer 246 converts the received bits into multi-bit (e.g., 10-bit) symbols 252. The symbols 252 can be encoded or unencoded. When the symbols 252 are encoded, the decoder 248 converts the symbols 252 into decoded symbols 250 using a predetermined decoding algorithm, for example, 8b10b decoding. The selector 260 selects one of the decoded symbols 250 and the received unencoded (i.e., IBIST symbols) 252 to output on data lines 262. The status generator 272 provides status signals 264.

In some embodiments the status signals 264 comprise RxDataK and RxStatus[0:2] signals specified by the PIPE specification. Embodiments use the RxDataK and RxStatus[0:2] signals to provide two of ten unencoded symbol bits when operating in IBIST mode. The status generator 272 provides special encodings of RxStatus[0:2] to identify a bit value. Embodiments encompass use of any RxStatus[0:2] encoding for the IBIST bit. The RX IBIST CNTRL unit 254 provides control signal "compliance received" 256 that controls whether decoded symbols 250 or undecoded (i.e., unencoded IBIST) symbols 252 are selected in selector 260 and status generator 272, and whether the IBIST PATTERN COMPARE unit 266 is enabled to verify IBIST symbols.

In normal host 268 transmitter operation (i.e., non-IBIST operation) data symbols 202 (e.g., 8-bit symbols) flow through selector 204. Selector output 210 is provided to encoder 216, which can be an 8b10b encoder. Control signals 206, preferably comprising TxDataK and TxCompliance, both in accordance with the PIPE specification, flow through selector 208. Selector 208 output 212 (e.g., TxDataK) is provided to the encoder 216 to control data versus control symbol encoding. The encoded output 228 of encoder 216 (e.g., a 10-bit symbol) flows through selector 230. The output 232 of the selector 230 is provided to the serializer 270. The serializer 270 converts symbols 232 from parallel to serial form, and provides the serialized symbols to differential transmitter 284, which transmits the bitstream 236 to the endpoint device 238.

In normal host 238 receiver operation, a bitstream 244 (e.g., an encoded bitstream) is received via the differential receiver/clock and data recovery circuit 286. Recovered bits and clock are provided to the deserializer 246. The deserializer 246 converts the recovered bits into multi-bit symbols (e.g., 10-bit symbols). The multi-bit symbols 252 are provided to the decoder 248 where encoding applied in the endpoint 238 is reversed to generate decoded symbols 250.

Decoded symbols 250 are provided to selector 260 and status generator 272. Decoded symbols 250 flow through the selector 260 to data signals 262. The status generator 272 produces status signals 264 preferably comprising RxDataK and RxStatus[0:2] in accordance with the PIPE specification. In normal (i.e., non-IBIST) operation, RxDataK specifies whether a corresponding symbol is a control symbol or a data symbol, and RxStatus[0:2] encodes receiver status and error codes. Selector 260 and status generator 272 respectively provide data signals 262 and control signals 264 to higher level host logic (not shown).

After the host 268 has trained (e.g., aligned and synchronized the bitstream, selected lanes, etc.) with the endpoint 238, and the endpoint 238 has been placed in loopback state (e.g., by transmission of a training ordered set indicating loopback should be enabled), the IBIST mode can be enabled to facilitate characterization of host 268 and endpoint 238 physical layer circuitry and interconnect. A system control element, for example the CPU 102 can invoke IBIST mode by causing assertion of IBIST control signal 274 by a register write or other means known in the art. With IBIST control signal 274 asserted to invoke IBIST mode, the IBIST CNTRL unit 220 asserts IBIST enable signal 222 to the TX IBIST CNTRL unit 226, and host 268 preferably continues to operate normally as explained above to encode 8-bit data 202, transmit encoded data, and provide decoder output 250 to higher level logic.

To continue IBIST activation, the PIPE control signal TxCompliance is asserted. As explained above, TxCompliance is a PIPE specification signal, and is preferably included in the control signals 206. In conjunction with the assertion of TxCompliance, a compliance pattern is transmitted. The compliance pattern is specified by the PCIe specification. The TxCompliance signal 224 output by the selector 208 is provided to the TX IBIST CNTRL unit 226 along with the unencoded data 210 output by the selector 204. The TX IBIST CNTRL unit 226 monitors the data symbols 210 when TxCompliance 224 and IBIST enable 222 are asserted to identify the compliance pattern.

When the compliance pattern is identified, the TX IBIST CNTRL unit 226 asserts the 10b mode signal 234 to cause the selector 230 to select unencoded data symbols 280 for output. Additionally, the 10b mode signal 234 is supplied to the RX IBIST CNTRL unit 254 to provide notification of IBIST symbol selection. The TX IBIST CNTRL unit 226 also notifies the IBIST CNTRL unit 220 of compliance pattern detection via compliance detected signal 276. In response to compliance pattern detection, the TX IBIST CNTRL unit 220 enables the IBIST PATTERN GENERATOR 218 to provide IBIST symbols 278, and asserts selector control signal 214 causing the selectors 204, 208 to select IBIST symbols 278 rather than normal symbols/control 202, 206.

IBIST symbols flow through the selectors 204, 208 to data lines 210 and control lines TxCompliance 224 and TxDataK 212. The signals are combined to form unencoded data symbols 280 that bypass the encoder 216. The unencoded IBIST symbols flow through the selector 230. The selector output 232 is provided to the serializer 270. The serializer 270 converts symbols 232 (unencoded) from parallel to serial form, and provides the serialized symbols to differential transmitter 284, which transmits the bitstream 236 including the unencoded symbols to the endpoint 238.

As explained above, the endpoint 238 is in loopback mode. In loopback mode the endpoint 238 receives the bitstream 236 via differential receiver/clock and data recovery circuit 288. The recovered bitstream and clock are converted to multi-bit (e.g., 10-bit) symbols in deserializer 240. The symbols are reserialized in serializer 242 with no intervening decoding or encoding, and transmitted back to the host 268 via differential transmitter 290. Thus, the symbols received in bitstream 236 are transmitted in bitstream 244.

The bitstream 244 transmitted by the endpoint 238 is received by the host 268 via the differential receiver/clock and data recovery circuit 286. Recovered bits and clock are deserialized in deserializer 246 to form multi-bit (e.g., 10-bit) symbols 252. The symbols 252 are provided to the decoder 248 for decoding. As explained above, the compliance pattern is transmitted before IBIST symbol transmission is enabled. In response to 10b mode signal 234, the RX IBIST CNTRL unit 254 monitors the decoded symbol stream 250 to identify the looped back compliance pattern. When the RX IBIST CNTRL unit 254 identifies the compliance pattern, the RX IBIST CNTRL unit 254 asserts the compliance-received signal 256 to the selector 260, status generator 272, and IBIST PATTERN COMPARE unit 266.

In response to the compliance-received signal 256, IBIST pattern verification begins. The selector 260 selects undecoded symbols 252 to form output 262 (i.e., bypasses the decoder 248). The status generator 272 outputs bits of the undecoded symbols 252 on status signal lines (e.g., RxDataK, and RxStatus[0:2]). The IBIST PATTERN COMPARE unit 266 verifies the symbol bits on data/status signals 262, 264 against the transmitted IBIST pattern and provides comparison results 282 to higher-level logic (not shown).

Thus, embodiments of the present disclosure provide the capability to drive unencoded symbols (i.e., bit patterns) stored in the IBIST PATTERN GENERATOR 218 onto a lane connecting the host device 268 to an endpoint device 238. The endpoint 238 is preferably a standard PCIe device. The endpoint 238 preferably loops the unencoded symbols back to the host 268. The looped back symbols bypass the decoder 248 in the host 268 receiver and are compared to the transmitted symbols by the IBIST PATTERN COMPARE unit 266.

Transmission of a compliance pattern and subsequent receipt of the looped back compliance pattern trigger start of IBIST pattern transmission and reception respectively. In a host 268 implemented with an 8-bit data path, PIPE control signals TxDataK and TxCompliance are preferably used to provide the ninth and tenth bits of a 10-bit IBIST symbol to be transmitted. In the host 268 receiver, PIPE status signals RxDataK and RxStatus[0:2] preferably are used to provide the ninth and tenth bits of a received 10-bit IBIST symbol to the IBIST PATTERN COMPARE unit 266.

Figure 3:
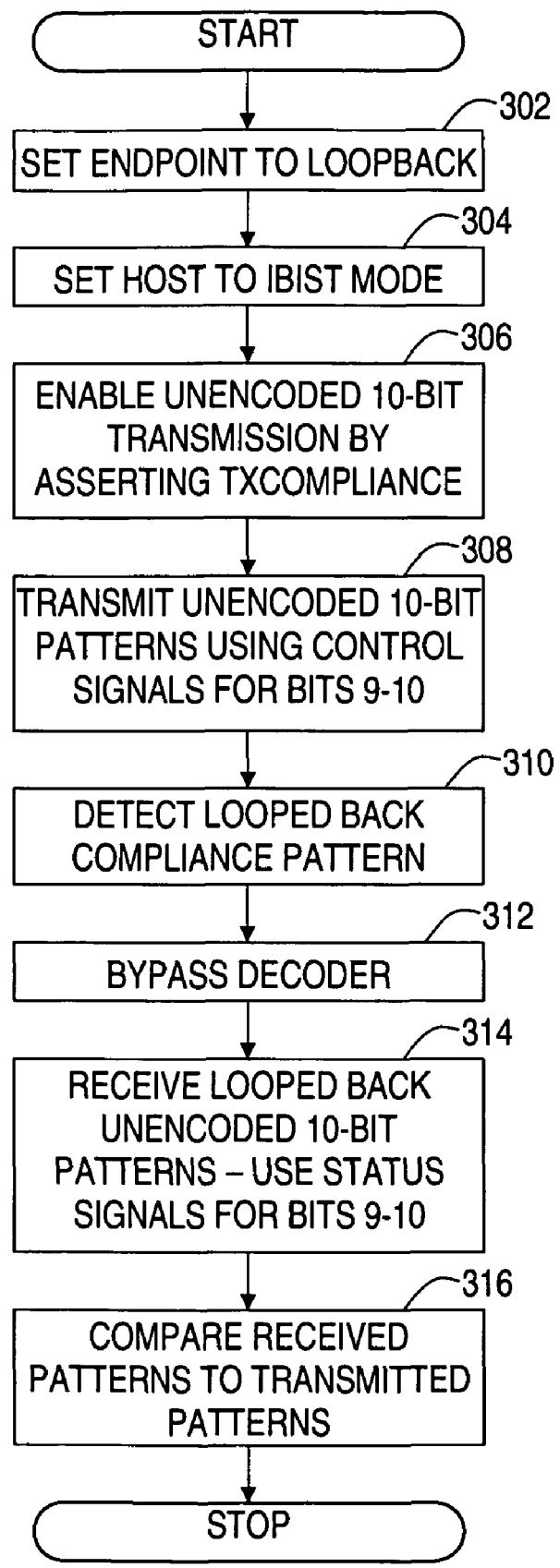
FIG. 3 shows a flow diagram for a method for performing IBIST in accordance with various embodiments.

FIG. 3 shows a flow diagram for a method for performing IBIST in accordance with various embodiments. Though depicted sequentially as a matter of convenience, at least some of the actions shown can be performed in a different order and/or performed in parallel. Additionally, some embodiments may perform only some of the actions shown.

In block 302, a PCIe host device 268 is connected to a PCIe endpoint device 238. The host device 268 includes IBIST capability as disclosed herein, and the endpoint device 238 includes loopback capability per the PCIe specification. The devices 268, 238 (e.g., differential transmitters 284, 290, differential receivers 288, 286) and associated interconnect are to be characterized using IBIST. The devices 268, 238 exchange training sets to align and synchronize the bitstream, select link lanes, etc. The endpoint device 238 is placed in loopback mode by, for example, a loopback control bit in a training set transmitted by the host 268.

In block 304, the host device 268 is set to IBIST mode. IBIST mode can be set by, for example, setting a bit in a processor writeable register. The register bit, or other means, preferably causes assertion of an IBIST control signal 274 that notifies the IBIST CNTRL unit 220 to prepare for IBIST characterization.

In block 306, the host device 268 asserts the PIPE control signal TxCompliance and transmits a compliance pattern in accordance with the PCIe specification. The compliance data is encoded in encoder 216 and transmitted to the endpoint 238. The TX IBIST CNTRL unit 226 is monitoring the unencoded data 210 to identify the compliance pattern. When the compliance pattern is identified, the TX IBIST CNTRL unit 226 asserts the 10b mode signal 234 and compliance-detected signal 276 to initiate IBIST symbol generation and bypassing of the encoder 216. Embodiments use the normal 8-bit pre-encode data path in conjunction with the two control signal lines, for example TxCompliance and TxDataK, to provide 10-bit IBIST symbols for transmission. Unencoded 10-bit IBIST patterns are transmitted to the endpoint 238 in block 308. The IBIST patterns include Skip Ordered Sets in accordance with the PCIe specification. The encoded values of the Skip Ordered Set symbols are stored in the IBIST PATTERN GENERATOR 218 along with the IBIST data. Data stored in the IBIST PATTERN GENERATOR 218 are programmable in at least some embodiments.

In block 310, the host device 268 receiver is receiving the bitstream 244 looped back from the endpoint device 238. The RX IBIST CNTRL unit 254 is monitoring the output 250 of the decoder 248. The assertion of the 10b mode signal 234 alerts the RX IBIST CNTRL unit 254 to upcoming arrival of a compliance pattern in the bitstream 244. When the RX IBIST CNTRL unit 254 identifies the received compliance pattern, the compliance-received signal 256 is asserted to cause IBIST symbols to bypass the decoder 248, in block 312, and the IBIST PATTERN COMPARE UNIT 266 to verify received IBIST symbols against the transmitted symbols.

In block 314, looped back unencoded IBIST patterns are received by the host 268. The received symbols bypass the decoder 248, and are driven, in part, onto the receiver data signals 262, and, in part, onto receiver status signals 264. In some embodiments, eight bits of a received symbol are driven onto the data signals 262, and two bits are driven on the receiver status signals 264. Embodiments preferably drive one bit onto the PIPE RxDataK line, and encode one bit in the PIPE RxStatus[0:2] lines.

In block 316, the received IBIST patterns are compared with the transmitted patterns in the IBIST PATTERN COMPARE unit 266 to facilitate characterization of the host device 268, endpoint device 238 and host-endpoint interconnect. Comparison results are provided to higher-level logic of the host device 268.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A loopback self test system, comprising:
   a host device that transmits unencoded test symbols; and
   an endpoint device that receives and loops back the unencoded test symbols to the host device;
   wherein the host device drives at least some bits of each unencoded test symbol onto host device data signals and drives at least some bits of each unencoded test symbol onto host device control signals.

2. The loopback self test system of claim 1, wherein the host device transmits an encoded data set to the endpoint device to initiate reception of unencoded symbols by the host device.

3. The loopback self test system of claim 1, wherein the host device comprises a comparator that compares looped back unencoded test symbols to transmitted unencoded test symbols, and derives a bit of a received unencoded symbol from a receiver status signal.

4. The loopback self test system of claim 3, wherein the host device further comprises a status generator that encodes a bit of a looped back unencoded test symbol in a multi-bit receiver status symbol.

5. The loopback self test system of claim 1, wherein the host device drives a bit of each unencoded test symbol to be transmitted onto a TxCompliance signal.

6. The loopback self test system of claim 1, wherein the host device asserts a TxCompliance signal to initiate transmission and reception of unencoded test symbols, and transmission of unencoded test symbols is initiated when transmission of a compliance pattern is detected.

7. The loopback self test system of claim 1, wherein the host device further comprises a test pattern generator that provides unencoded symbols and encoded skip ordered sets for transmission to the endpoint device.

8. A method, comprising:
 initiating transmission of unencoded test symbols in a Peripheral Component Interconnect Express PCIe) host by asserting a TxCompliance signal; and
 transmitting unencoded test symbols to a PCIe endpoint operating in loopback mode.

9. The method of claim 8, further comprising encoding a bit of the unencoded test symbol in the TxCompliance signal.

10. The method of claim 8, further comprising detecting a compliance pattern looped back from the PCIe endpoint to identify a point in a received bitstream at which unencoded symbols begin.

11. The method of claim 8, further comprising bypassing a symbol encoder after transmission of a compliance pattern is detected and bypassing a symbol decoder after reception of a compliance pattern is detected.

12. The method of claim 8, further comprising encoding bits of a received unencoded data symbol in PCIe status signals.

13. A loopback test host device, comprising:
 an interconnect built in self test (IBIST) receive controller; and
 an IBIST transmit controller;
 wherein the IBIST transmit controller selects a set of signals comprising data signals and control signals and drives onto each signal of the set a portion of an unencoded test symbol transmitted to a loopback endpoint.

14. The loopback test host device of claim 13, wherein the IBIST receive controller drives at least some bits of a received unencoded symbol onto receive data signals and at least some bits of the received unencoded symbol onto receive status signals.

15. The loopback test host device of claim 13, further comprising an IBIST pattern generator that stores unencoded test patterns and encoded Skip ordered sets.

16. The loopback test host device of claim 13, further comprising:
 an encoder that encodes symbols to be transmitted;
 wherein the IBIST transmit controller is configured to monitor symbols provided to the encoder for encoding, identify a compliance symbol provided to the encoder, and based on identifying the compliance symbol initiate transmission of unencoded symbols.

17. The loopback test device of claim 13, wherein the IBIST receive controller is configured to identify a looped back decoded compliance pattern, and to initiate verification of looped back unencoded symbols based on the identification.

18. The loopback test device of claim 13, wherein the IBIST receive controller is configured to encode a single bit of a received unencoded symbol in a plurality of status signals.

* * * * *